United States Patent
Seo et al.

(10) Patent No.: US 9,276,711 B2
(45) Date of Patent: Mar. 1, 2016

(54) COMMUNICATION METHOD AND APPARATUS IN A MULTI-CARRIER SYSTEM

(75) Inventors: Dong Youn Seo, Anyang-si (KR); Suck Chel Yang, Anyang-si (KR); Jung Hoon Lee, Anyang-si (KR); Joon Kui Ahn, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 1157 days.

(21) Appl. No.: 13/318,154

(22) PCT Filed: May 12, 2010

(86) PCT No.: PCT/KR2010/002995
§ 371 (c)(1),
(2), (4) Date: Oct. 31, 2011

(87) PCT Pub. No.: WO2010/131897
PCT Pub. Date: Nov. 18, 2010

(65) Prior Publication Data
US 2012/0051313 A1    Mar. 1, 2012

Related U.S. Application Data

(60) Provisional application No. 61/177,631, filed on May 12, 2009.

(30) Foreign Application Priority Data

May 11, 2010    (KR) .................. 10-2010-0043735

(51) Int. Cl.
*H04L 5/00* (2006.01)
*H04W 72/12* (2009.01)
*H04W 72/04* (2009.01)

(52) U.S. Cl.
CPC ........... *H04L 5/003* (2013.01); *H04W 72/0413* (2013.01); *H04W 72/1284* (2013.01); *H04W 72/0406* (2013.01)

(58) Field of Classification Search
None
See application file for complete search history.

(56) References Cited

U.S. PATENT DOCUMENTS

2009/0129330 A1    5/2009    Kim et al.
2010/0142475 A1    6/2010    Kim et al.
2010/0232382 A1*   9/2010    Gauvreau et al. ............ 370/329

FOREIGN PATENT DOCUMENTS

| KR | 10-2007-0107577 A | 11/2007 |
| KR | 10-0968223 B1 | 7/2010 |
| WO | WO 2009/035297 A2 | 3/2009 |

OTHER PUBLICATIONS

Texas Instruments, NPL Publication "Dynamic ACK/NAK Channelization on PUCCH", R1-081375, Mar. 31-Apr. 4, 2008.*

* cited by examiner

*Primary Examiner* — Jackie Zuniga Abad
(74) *Attorney, Agent, or Firm* — Birch, Stewart, Kolasch & Birch, LLP

(57) ABSTRACT

Disclosed are a multi-carrier supporting method and apparatus. A terminal receives information on at least one allocated component carrier from among a plurality of component carriers from a base station, and receives activation control information on an active component carrier that is activated from among the at least one allocated component carrier via a downlink control channel. The terminal transmits a reception acknowledgement for the activation control information via an uplink control channel.

12 Claims, 13 Drawing Sheets

FIG. 12
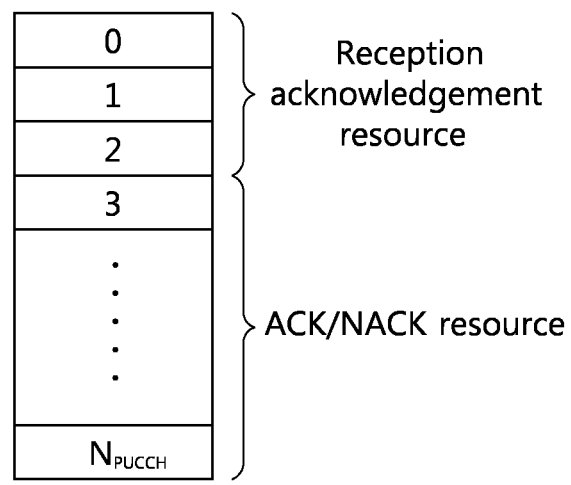
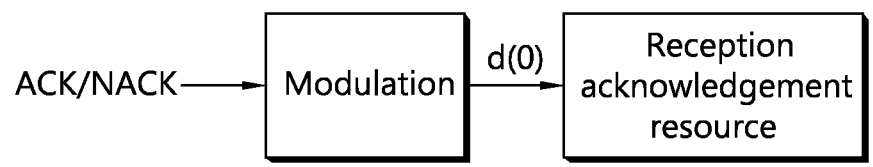

COMMUNICATION METHOD AND APPARATUS IN A MULTI-CARRIER SYSTEM

CROSS REFERENCE TO RELATED APPLICATIONS

This application is the National Phase of PCT/KR2010/002995 filed on May 12, 2010, which claims priority under 35 U.S.C. 119(e) to U.S. Provisional Application No. 61/177,631 filed on May 12, 2009 and under 35 U.S.C. 119(a) to Patent Application No. 10-2010-0043735 filed in the Republic of Korea on May 11, 2010, all of which are hereby expressly incorporated by reference into the present application.

TECHNICAL FIELD

The present invention relates to wireless communications, and more particularly, to an apparatus and method for supporting multiple carriers in a wireless communication system.

BACKGROUND ART

In a typical wireless communication system, only one carrier is considered even if a bandwidth between an uplink and a downlink is configured differently from each other. The carrier is defined with a center frequency and a bandwidth. A multi-carrier system uses a plurality of component carriers (CCs) having a smaller bandwidth than a full bandwidth.

The multi-carrier system can support backward compatibility with respect to legacy systems, and significantly increases a data rate by using multiple carriers.

Long term evolution (LTE) based on $3^{rd}$ generation partnership project (3GPP) technical specification (TS) release 8 is a most dominant next mobile communication standard. The 3GPP LTE system supports only one bandwidth (i.e., one CC) among {1.4, 3, 5, 10, 15, 20}MHz. However, an LTE-advanced (LTE-A) system which is an evolution of the 3GPP LTE employs multiple carriers.

Even if the multi-carrier system uses a plurality of CCs, it may be ineffective for a base station (BS) and a user equipment (UE) to use all CCs concurrently. Therefore, dynamic scheduling for the CC is required. For example, more CCs are allocated to a UE that requires a high data rate, and less CCs are allocated to a UE that requires a low data rate such as voice.

It is necessary to ensure transmission reliability in a control signal such as activation of the CC. This is because when mutually activated CCs become different between the BS station and the UE, data loss may occur and service quality may deteriorate significantly.

Accordingly, there is a need for a method capable of reliably activating a plurality of CCs in a multi-carrier system.

SUMMARY OF INVENTION

Technical Problem

The present invention provides a communication method and apparatus for operating multiple carriers in a multi-carrier system.

The present invention also provides a method and apparatus for transmitting a reception acknowledgement for a control signal in a multi-carrier system.

Technical Solution

In an aspect, a communication method in a multi-carrier system includes receiving information regarding at least one assigned component carrier among a plurality of component carriers from a base station, receiving activation control information regarding an active component carrier that is activated among the at least one assigned component carrier through a downlink control channel, and transmitting a reception acknowledgement for the activation control information through an uplink control channel.

The downlink control channel may be a physical downlink control channel (PDCCH), and the uplink control channel may be a physical uplink control channel (PUCCH).

A reception acknowledgement resource used for transmission of the PUCCH may be determined on the basis of a resource used for transmission of the PDCCH.

A reception acknowledgement resource used for transmission of the PUCCH may be reserved in advance.

Information regarding the reserved reception acknowledgement resource is received from the base station.

When a subframe for transmitting the reception acknowledgement overlaps with a subframe for transmitting a hybrid automatic repeat request (HARQ) acknowledgement (ACK)/not-acknowledgement (NACK) signal, the HARQ ACK/NACK signal may be transmitted through the PUCCH configured by using the reception acknowledgement resource.

In another aspect, a user equipment includes a radio frequency (RF) unit for transmitting and receiving a radio signal, and a processor operatively connected to the RF unit and configured to receive information regarding at least one assigned component carrier among a plurality of component carriers from a base station, receive activation control information regarding an active component carrier that is activated among the at least one assigned component carrier through a downlink control channel, and transmit a reception acknowledgement for the activation control information through an uplink control channel.

Advantageous Effects

A mismatch for activated component carriers between a base station and a user equipment can be prevented, thereby decreasing unnecessary physical downlink control channel monitoring attempt. Battery consumption of the user equipment can be decreased, and a more reliable communication service can be provided.

DESCRIPTION OF DRAWINGS

FIG. 12 shows an example of simultaneous transmission of an HARQ ACK/NACK signal and an activation reception acknowledgement.

MODE FOR INVENTION

A user equipment (UE) 12 may be fixed or mobile, and may be referred to as another terminology, such as a mobile station (MS), a user terminal (UT), a subscriber station (SS), a wireless device, a personal digital assistant (PDA), a wireless modem, a handheld device, etc.

A base station (BS) 11 is generally a fixed station that communicates with the UE 12 and may be referred to as another terminology, such as an evolved node-B (eNB), a base transceiver system (BTS), an access point, etc.

Each BS provides a communication service to a specific geographical region (generally referred to as a cell). The cell can be divided into a plurality of regions (referred to as sectors).

Hereinafter, downlink (DL) denotes a communication link from the BS to the UE, and uplink (UL) denotes a communication link from the UE to the BS. In the DL, a transmitter may be a part of the BS, and a receiver may be a part of the UE. In the UL, the transmitter may be a part of the UE, and the receiver may be a part of the BS.

Figure 1:
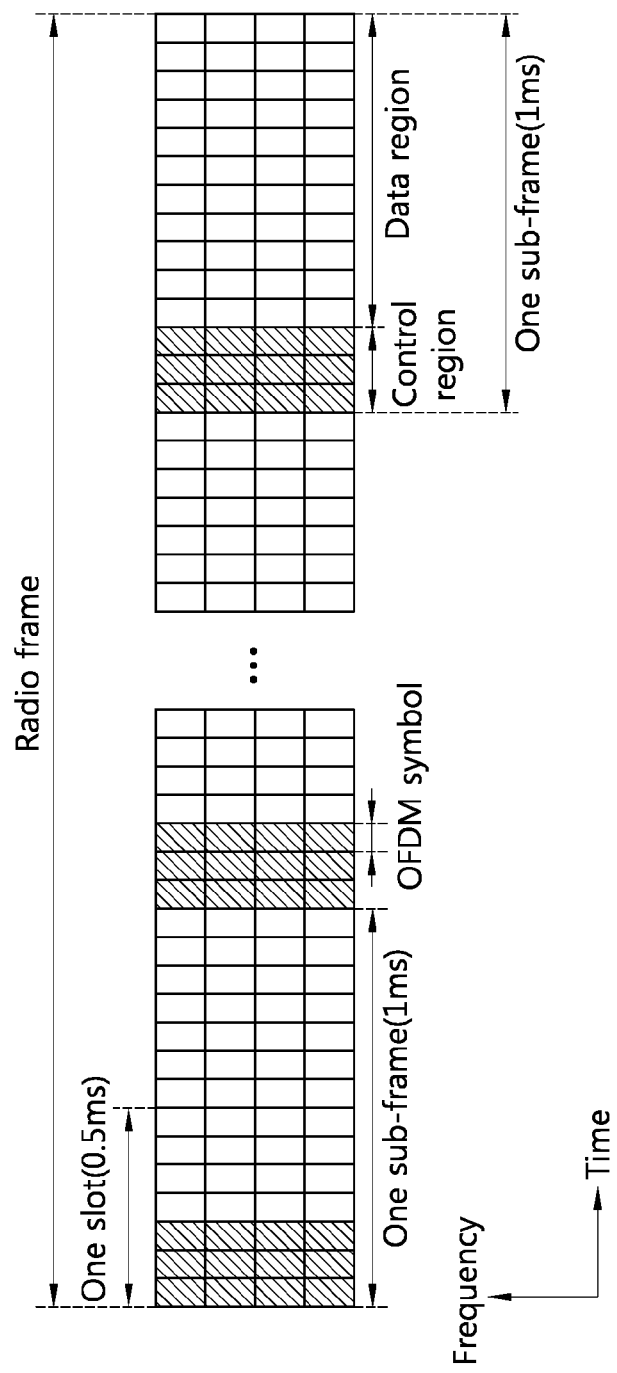
FIG. 1 shows a downlink radio frame structure in $3^{rd}$ generation partnership project (3GPP) long term evolution (LTE).

FIG. 1 shows a DL radio frame structure in $3^{rd}$ generation partnership project (3GPP) long term evolution (LTE). The section 6 of 3GPP TS 36.211 V8.5.0 (2008-12) "Evolved Universal Terrestrial Radio Access (E-UTRA); Physical Channels and Modulation (Release 8)" may be incorporated herein by reference. A radio frame consists of 10 subframes indexed with 0 to 9. One subframe consists of 2 slots. A time required for transmitting one subframe is defined as a transmission time interval (TTI). For example, one subframe may have a length of 1 millisecond (ms), and one slot may have a length of 0.5 ms.

One slot may include a plurality of orthogonal frequency division multiplexing (OFDM) symbols in a time domain. Since the 3GPP LTE uses orthogonal frequency division multiple access (OFDMA) in a downlink, the OFDM symbol is only for expressing one symbol period in the time domain, and there is no limitation in a multiple access scheme or terminologies. For example, the OFDM symbol may also be referred to as another terminology such as a single carrier frequency division multiple access (SC-FDMA) symbol, a symbol period, etc.

Although it is described that one slot includes 7 OFDM symbols for example, the number of OFDM symbols included in one slot may vary depending on a length of a cyclic prefix (CP). According to 3GPP TS 36.211 V8.5.0 (2008-12), in case of a normal CP, one subframe includes 7 OFDM symbols, and in case of an extended CP, one subframe includes 6 OFDM symbols.

A resource block (RB) is a resource allocation unit, and includes a plurality of subcarriers in one slot. For example, if one slot includes 7 OFDM symbols in a time domain and an RB includes 12 subcarriers in a frequency domain, one RB can include 7×12 resource elements (REs).

A subframe is divided into a control region and a data region in the time domain. The control region includes up to three preceding OFDM symbols of a $1^{st}$ slot in the subframe. The number of OFDM symbols included in the control region may vary. A physical downlink control channel (PDCCH) is allocated to the control region, and a physical downlink shared channel (PDSCH) is allocated to the data region.

As disclosed in 3GPP TS 36.211 V8.5.0 (2008-12), the LTE classifies a physical channel into a data channel, i.e., a physical downlink shared channel (PDSCH) and a physical uplink shared channel (PUSCH), and a control channel, i.e., a physical downlink control channel (PDCCH), a physical control format indicator channel (PCFICH) and a physical hybrid-ARQ indicator channel (PHICH), and a physical uplink control channel (PUCCH).

The PCFICH transmitted in a $1^{st}$ OFDM symbol in the subframe carries a control format indicator (CFI) regarding the number of OFDM symbols (i.e., a size of the control region) used for transmission of control channels in the subframe. The UE first receives the CFI through the PCFICH, and thereafter monitors the PDCCH.

The PHICH carries an acknowledgement (ACK)/not-acknowledgement (NACK) signal for uplink hybrid automatic repeat request (HARQ). The ACK/NACK signal for UL data transmitted by the UE is transmitted through the PHICH.

Control information transmitted through the PDCCH is referred to as downlink control information (DCI). The DCI may include resource allocation of the PDSCH (this is referred to as a DL grant), resource allocation of a PUSCH (this is referred to as a UL grant), a set of transmit power control commands for individual UEs in any UE group and/or activation of a voice over Internet protocol (VoIP).

The DCI on the PDCCH is received by using blind decoding. A plurality of candidate PDCCHs can be transmitted in the control region of one subframe. The UE monitors the plurality of candidate PDCCHs in every subframe. Herein, monitoring is an operation in which the UE attempts decoding of each PDCCH according to a format of PDCCH to be monitored. The UE monitors a set of PDCCH candidates in a subframe to find its own PDCCH. For example, if there is no cyclic redundancy check (CRC) error detected by performing de-making on an identifier (i.e., cell-radio network temporary identifier (RNTI)) of the UE in a corresponding PDCCH, the UE detects this PDCCH as a PDCCH having the DCI of the UE.

The control region in the subframe includes a plurality of control channel elements (CCEs). The CCE is a logical allocation unit used to provide the PDCCH with a code rate depending on a wireless channel. The CCE corresponds to a plurality of resource element groups (REGs). The REG includes a plurality of REs. According to a relation between the number of CCEs and the code rate provided by the CCEs, the PDCCH format and a possible number of bits of the PDCCH are determined.

In order to receive DL data, the UE first receives a DL resource allocation through the PDCCH. When PDCCH detection is successful, the UE reads the DCI on the PDCCH. By using the DL resource allocation in the DCI, DL data on the PDSCH is received. In addition, in order to transmit UL data, the UE first receives a UL resource allocation through the PDCCH. When PDCCH detection is successful, the UE reads the DCI on the PDCCH. By using the UL resource allocation in the DCI, UL data on the PUSCH is transmitted.

The 3GPP LTE uses synchronous HARQ in UL transmission, and uses asynchronous HARQ in DL transmission. In the synchronous HARQ, retransmission timing is fixed. In the asynchronous HARQ, the retransmission timing is not fixed. That is, in the synchronous HARQ, initial transmission and retransmission are performed with an HARQ interval.

Figure 2:
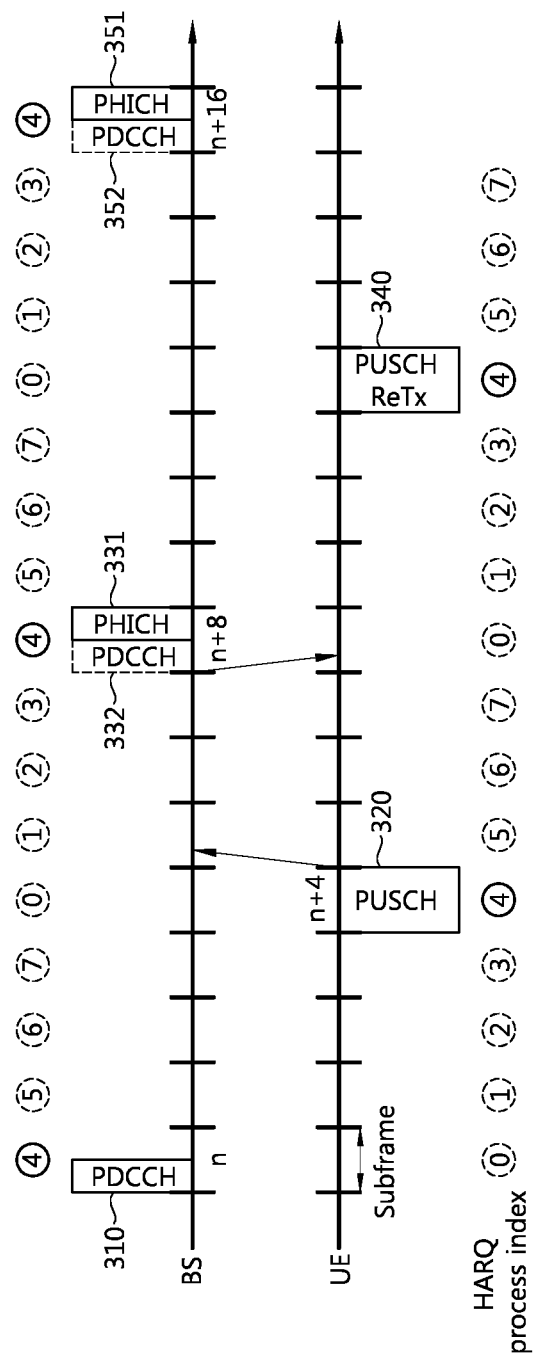
FIG. 2 shows uplink synchronous hybrid automatic repeat request (HARQ) in 3GPP LTE.

FIG. 2 shows UL synchronous HARQ in 3GPP LTE.

A UE receives an initial UL resource allocation on a PDCCH 310 from a BS in an $n^{th}$ subframe.

The UE transmits a UL transport block on a PUSCH 320 by using the initial UL resource allocation in an $(n+4)^{th}$ subframe.

The BS sends an ACK/NACK signal for the UL transport block on a PHICH 331 in an $(n+8)^{th}$ subframe. The ACK/NACK signal indicates a reception acknowledgement for the UL transport block. The ACK signal indicates a reception success, and the NACK signal indicates a reception failure. When the ACK/NACK signal is the NACK signal, the BS may send a retransmission UL resource allocation on a PDCCH 332, or may not send an additional UL resource allocation.

Upon receiving the NACK signal, the UE sends a retransmission block on a PUSCH 340 in an $(n+12)^{th}$ subframe. For the transmission of the retransmission block, if the retransmission UL resource allocation is received on the PDCCH 332, the UE uses the retransmission UL resource allocation, and if the retransmission UL resource allocation is not received, the UE uses the initial UL resource allocation.

The BS sends an ACK/NACK signal for the UL transport block on a PHICH 351 in an $(n+16)^{th}$ subframe. When the ACK/NACK signal is the NACK signal, the BS may send a retransmission UL resource allocation on a PDCCH 352, or may not send an additional UL resource allocation.

After initial transmission performed in the $(n+4)^{th}$ subframe, retransmission is performed in the $(n+12)^{th}$ subframe, and thus synchronous HARQ is performed with an HARQ interval corresponding to 8 subframes.

Therefore, in 3GPP LTE frequency division duplex (FDD), 8 HARQ processes can be performed, and the respective HARQ processes are indexed from 0 to 7. The aforementioned example shows a case where HARQ is performed at an HARQ process index 4.

Figure 3:
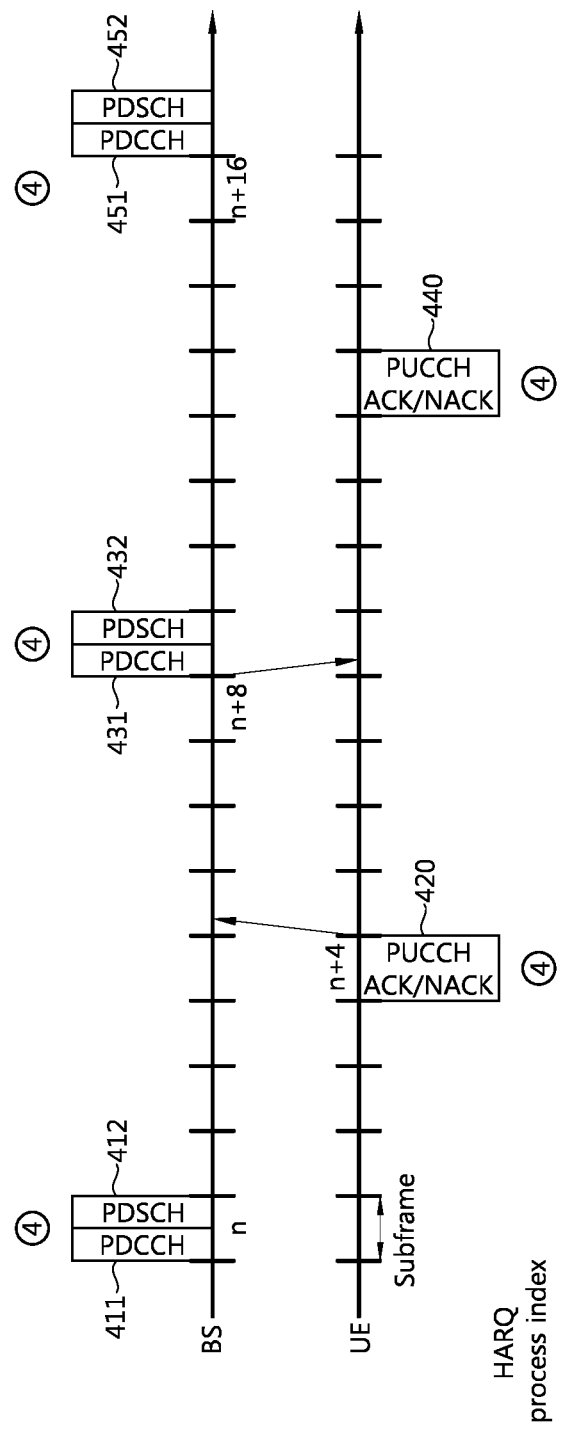
FIG. 3 shows downlink asynchronous HARQ in 3GPP LTE.

FIG. 3 shows DL asynchronous HARQ in 3GPP LTE.

A BS transmits a DL transport block to a UE on a PDSCH 412 indicated by a DL resource allocation on a PDCCH 411 in an $n^{th}$ subframe.

The UE sends an ACK/NACK signal on a PUCCH 420 in an $(n+4)^{th}$ subframe. A resource of the PUCCH 420 used in transmission of the ACK/NACK signal is determined based on a resource of the PDCCH 411 (e.g., an index of a $1^{st}$ CCE used in transmission of the PDCCH 411).

Even if the NACK signal is received from the UE, the BS does not necessarily perform retransmission in an $(n+8)^{th}$ subframe unlike in the UL HARQ. Herein, a retransmission block is transmitted on a PDSCH 432 indicated by a DL resource allocation on a PDCCH 431 in an $(n+9)^{th}$ subframe.

The UE sends an ACK/NACK signal on a PUCCH 440 in an $(n+13)^{th}$ subframe.

According to asynchronous HARQ, the BS does not necessarily perform retransmission in a predetermined interval even if a retransmission request of the UE is received.

Now, transmission of an HARQ ACK/NACK signal through a PUCCH in 3GPP LTE will be described.

Figure 4:
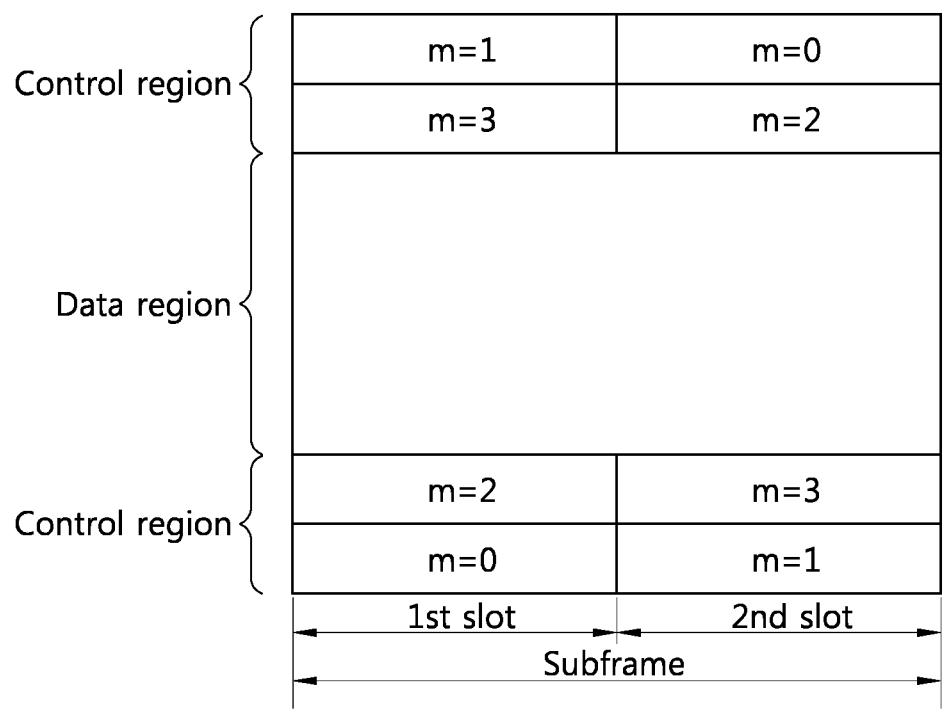
FIG. 4 shows an example of an uplink subframe in 3GPP LTE.

FIG. 4 shows an example of a UL subframe in 3GPP LTE.

A UL subframe can be divided into a control region to which a physical uplink control channel (PUCCH) for carrying UL control information is allocated and a data region to which a physical uplink shared channel (PUSCH) for carrying UL data is allocated. The PUCCH for one UE is allocated in an RB pair. RBs belonging to the RB pair occupy different subcarriers in each of a $1^{st}$ slot and a $2^{nd}$ slot. In FIG. 4, m is a location index indicating a logical frequency-domain location of the RB pair allocated to the PUCCH in the subframe. It shows that RBs having the same value m occupy different subcarriers in two slots.

According to 3GPP TS 36.211 V8.5.0 (2008-12), the PUCCH supports multiple formats. A PUCCH having a different number of bits per subframe can be used according to a modulation scheme depending on a PUCCH format. Table 1 below shows an example of a modulation scheme and the number of bits per subframe with respect to the PUCCH format.

TABLE 1

| PUCCH Format | Modulation Scheme | Number of Bits per subframe |
| --- | --- | --- |
| 1 | N/A | N/A |
| 1a | BPSK | 1 |
| 1b | QPSK | 2 |
| 2 | QPSK | 20 |
| 2a | QPSK + BPSK | 21 |
| 2b | QPSK + BPSK | 22 |

The PUCCH format 1 is used for transmission of a scheduling request (SR). The PUCCH formats 1a/1b are used for transmission of an ACK/NACK signal. The PUCCH format 2 is used for transmission of a CQI. The PUCCH formats 2a/2b are used for simultaneous transmission of the CQI and the ACK/NACK signal. When only the ACK/NACK signal is transmitted in a subframe, the PUCCH formats 1a/1b are used. When the SR is transmitted alone, the PUCCH format 1 is used. When the SR and the ACK/NACK are simultaneously transmitted, the PUCCH format 1 is used, and in this transmission, the ACK/NACK signal is modulated by using a resource allocated to the SR.

All PUCCH formats use a cyclic shift (CS) of a sequence in each OFDM symbol. The cyclically shifted sequence is generated by cyclically shifting a base sequence by a specific CS amount. The specific CS amount is indicated by a CS index.

An example of a base sequence $r_u(n)$ is defined by Equation 1 below.

$$r_u(n) = e^{jb(n)\pi/4}$$ [Equation 1]

In Equation 1, u denotes a root index, and n denotes a component index in the range of $0 \leq n \leq N-1$, where N is a length of the base sequence. The length of the sequence is equal to the number of elements included in the sequence. u can be determined by a cell identifier (ID), a slot number in a radio frame, etc. When it is assumed that the base sequence is mapped to one RB in a frequency domain, the length N of the base sequence is 12 since one RB includes 12 subcarriers. A different base sequence is defined according to a different root index.

If N=12 and u ∈ {0, . . . , 29} in 3GPP TS 36.211 V8.4.0 (2008-09), b(n) is defined by Table 2 below.

TABLE 2

| u | b(0), . . . , b(11) |
| --- | --- |
| 0 | −1 1 3 −3 3 3 1 1 3 1 −3 3 |
| 1 | 1 1 3 3 3 −1 1 −3 −3 1 −3 3 |
| 2 | 1 1 −3 −3 −3 −1 −3 −3 1 −3 1 −1 |
| 3 | −1 1 1 1 1 −1 −3 −3 1 −3 3 −1 |
| 4 | −1 3 1 −1 1 −1 −3 −1 1 −1 1 3 |
| 5 | 1 −3 3 −1 −1 1 1 −1 −1 3 −3 1 |
| 6 | −1 3 −3 −3 −3 3 1 −1 3 3 −3 1 |
| 7 | −3 −1 −1 −1 1 −3 3 −1 1 −3 3 1 |
| 8 | 1 −3 3 1 −1 −1 −1 1 1 3 −1 1 |
| 9 | 1 −3 −1 3 3 −1 −3 1 1 1 1 1 |
| 10 | −1 3 −1 1 1 −3 −3 −1 −3 −3 3 −1 |

TABLE 2-continued

| u | b(0), ..., b(11) |
|---|---|
| 11 | 3 1 −1 −1 3 3 −3 1 3 1 3 3 |
| 12 | 1 −3 1 1 −3 1 1 1 −3 −3 −3 1 |
| 13 | 3 3 −3 3 −3 1 1 3 −1 −3 3 3 |
| 14 | −3 1 −1 −3 −1 3 1 3 3 3 −1 1 |
| 15 | 3 −1 1 −3 −1 −1 1 1 3 1 −1 −3 |
| 16 | 1 3 1 −1 1 3 3 3 −1 −1 3 −1 |
| 17 | −3 1 1 3 −3 3 −3 −3 3 1 3 −1 |
| 18 | −3 1 3 1 −3 1 −3 −3 −1 −1 1 −3 |
| 19 | −1 3 1 3 1 −1 −1 3 −3 −1 −3 −1 |
| 20 | −1 −3 1 1 1 1 3 1 −1 1 −3 −1 |
| 21 | −1 3 −1 1 −3 −3 −3 −3 −3 1 −1 −3 |
| 22 | 1 1 −3 −3 −3 −3 −1 3 −3 1 −3 3 |
| 23 | 1 1 −1 −3 −1 −3 1 −1 1 3 −1 1 |
| 24 | 1 1 3 1 3 3 −1 1 −1 −3 −3 1 |
| 25 | 1 −3 3 3 1 3 3 1 −3 −1 −1 3 |
| 26 | 1 3 −3 −3 3 −3 1 −1 −1 3 −1 −3 |
| 27 | −3 1 −−3 −1 −3 3 1 −1 1 3 −3 −3 |
| 28 | −1 3 −3 3 −1 3 3 −3 3 3 −1 −1 |
| 29 | 3 −3 −3 −1 −1 −3 −1 3 −3 3 1 −1 |

The base sequence r(n) can be cyclically shifted by Equation 2 below to generate a cyclically shifted sequence $r(n, I_{cs})$.

$$r(n, I_{cs}) = r(n) \cdot \exp\left(\frac{j2\pi I_{cs} n}{N}\right), 0 \leq I_{cs} \leq N-1 \quad \text{[Equation 2]}$$

In Equation 2, $I_{cs}$ denotes a CS index indicating a CS amount ($0 \leq I_{cs} \leq N-1$).

Hereinafter, the available CS of the base sequence denotes a CS that can be derived from the base sequence according to a CS unit. For example, if the base sequence has a length of 12 and the CS unit is 1, the total number of available CS indices of the base sequence is 12. Alternatively, if the base sequence has a length of 12 and the CS unit is 6, the total number of available CS indices of the base sequence is 6.

Figure 5:
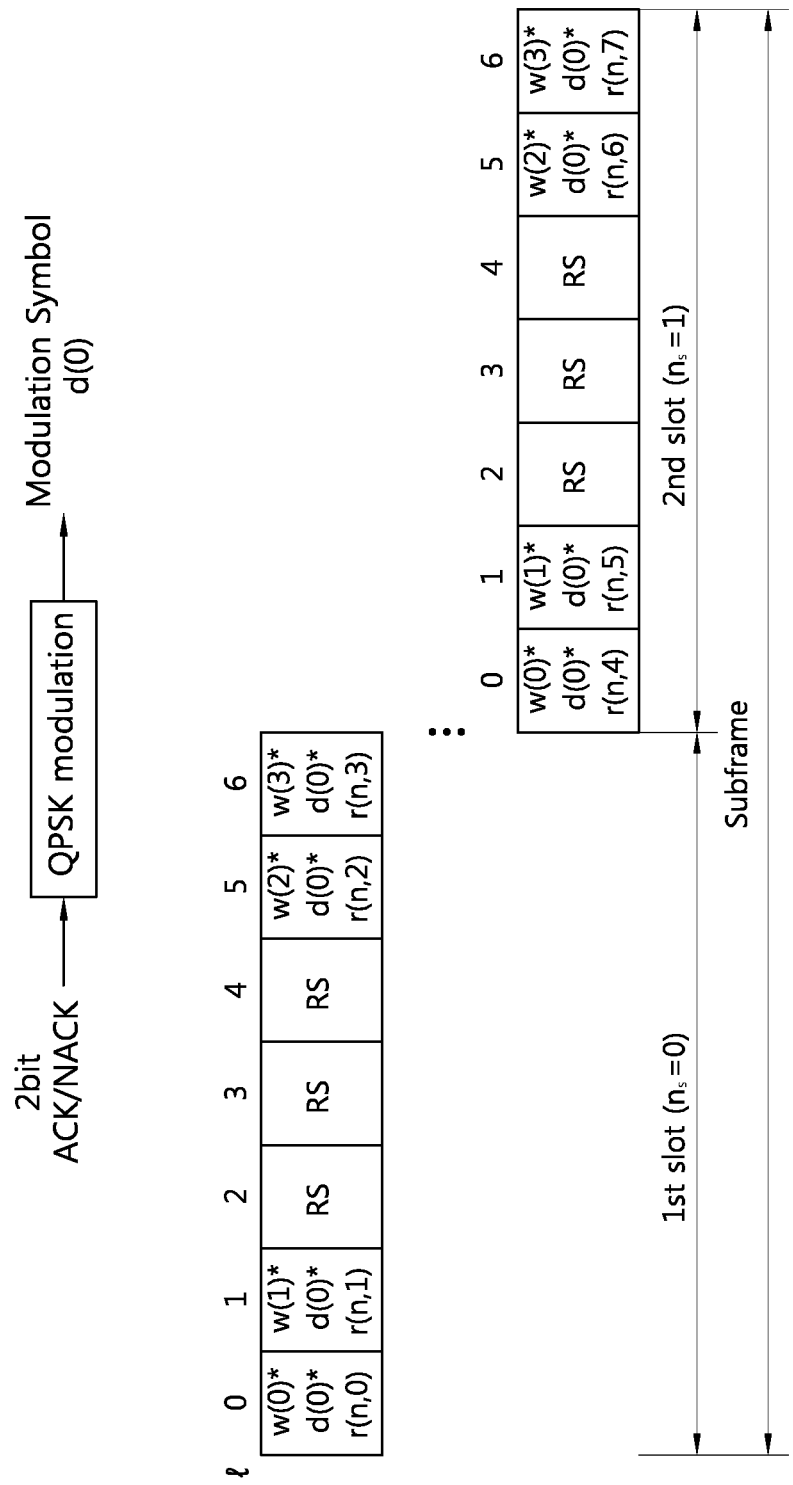
FIG. 5 shows a PUCCH format 1b in a normal cyclic prefix (CP) in 3GPP LTE.
Figure 6:
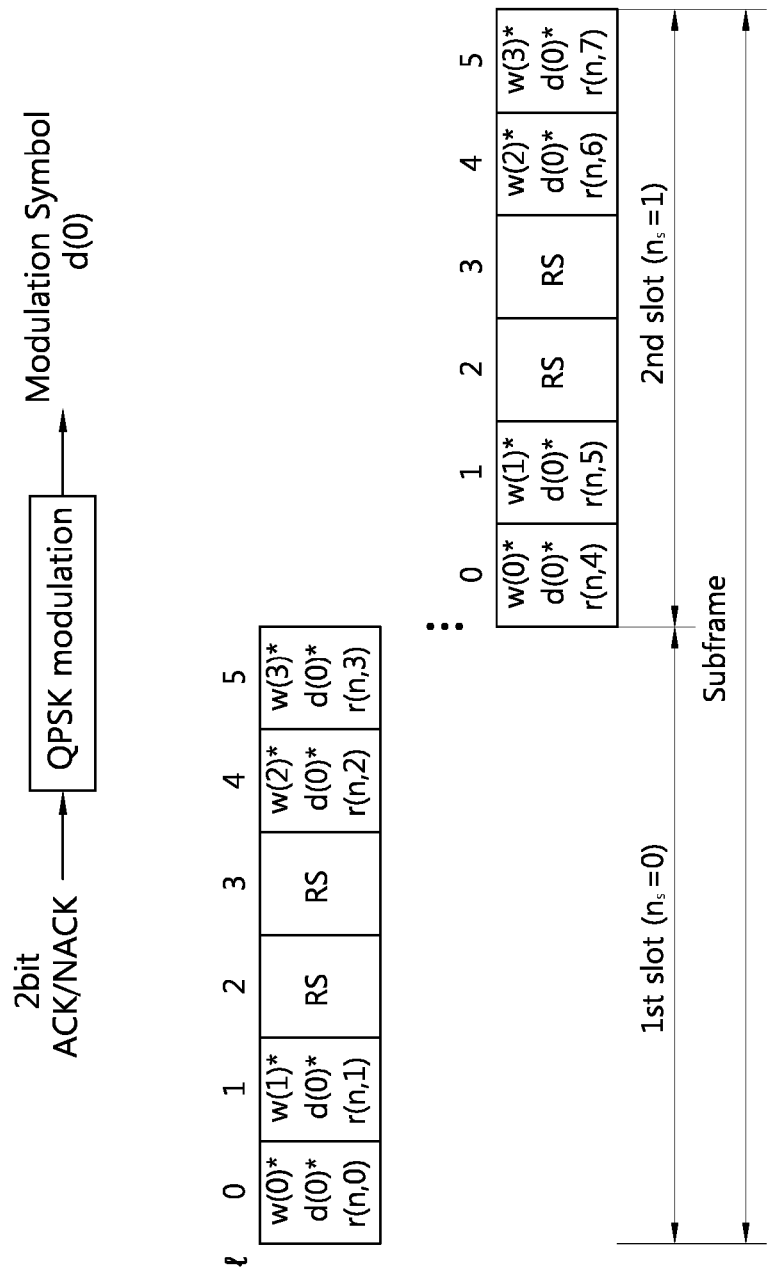
FIG. 6 shows a PUCCH format 1b in an extended CP in 3GPP LTE.

FIG. 5 shows a PUCCH format 1b in a normal CP in 3GPP LTE. FIG. 6 shows a PUCCH format 1b in an extended CP in 3GPP LTE. A location of a reference signal (RS) and the number of RSs are different between the normal CP and the extended CP since the number of OFDM symbols included in each slot are different, but ACK/NACK transmission is performed with the same structure between the normal CP and the extended CP.

A modulation symbol d(0) is generated by modulating a 1-bit ACK/NACK signal based on binary phase shift keying (BPSK) or by modulating a 2-bit ACK/NACK signal based on quadrature phase shift keying (QPSK). Table 3 below shows an example of constellation mapping of the 1-bit or 2-bit ACK/NACK signal.

TABLE 3

| PUCCH Format | ACK/NACK | d(0) |
|---|---|---|
| 1a | 0 | 1 |
|  | 1 | −1 |
| 1b | 00 | 1 |
|  | 01 | −j |
|  | 10 | j |
|  | 11 | −1 |

Since 5 OFDM symbols are present for transmission of the ACK/NACK signal in one slot in the normal CP or the extended CP, 10 OFDM symbols are present in total for transmission of the ACK/NACK signal in one subframe. The modulation symbol d(0) is spread to a cyclically shifted sequence $r(n, I_{cs})$. When a one-dimensionally spread sequence corresponding to an $(i+1)^{th}$ OFDM symbol is denoted by m(i), it can be expressed as follows.

$$\{m(0), m(1), \ldots, m(9)\} = \{d(0)r(n, I_{cs}), d(0)r(n, I_{cs}), \ldots, d(0)r(n, I_{cs})\}$$

In order to increase UE capacity, the one-dimensionally spread sequence can be spread by using an orthogonal sequence. An orthogonal sequence $w_i(k)$ (where i is a sequence index, $0 \leq k \leq K-1$) having a spread factor K=4 uses the following sequence.

TABLE 4

| Index (i) | $[w_i(0), w_i(1), w_i(2), w_i(3)]$ |
|---|---|
| 0 | [+1, +1, +1, +1] |
| 1 | [+1, −1, +1, −1] |
| 2 | [+1, −1, −1, +1] |

An orthogonal sequence $w_i(k)$ (where i is a sequence index, $0 \leq k \leq K-1$) having a spread factor K=3 uses the following sequence.

TABLE 5

| Index (i) | $[w_i(0), w_i(1), w_i(2)]$ |
|---|---|
| 0 | [+1, +1, +1] |
| 1 | $[+1, e^{j2\pi/3}, e^{j4\pi/3}]$ |
| 2 | $[+1, e^{j4\pi/3}, e^{j2\pi/3}]$ |

A different spread factor can be used for each slot. In 3GPP LTE, a last OFDM symbol in a subframe is used for transmission of a sounding reference signal (SRS). In this case, a PUCCH uses a spread factor K=4 for a $1^{st}$ slot and uses a spread factor K=3 of a $2^{nd}$ slot.

Therefore, when any orthogonal sequence index i is given, two-dimensionally spread sequences s(0), s(1), ..., s(9) can be expressed as follows.

$$\{s(0), s(1), \ldots, s(9)\} = \{w_i(0)m(0), w_i(1)m(1), w_i(2)m(2), w_i(3)m(3), w_i(4)m(4), w_i(0)m(5), w_i(1)m(7), w_i(2)m(8), w_i(3)m(9)\}$$

A CS index $I_{cs}$ can vary depending on a slot number $n_s$ in a radio frame and/or a symbol index l in a slot. When a $1^{st}$ CS index is set to 0 and a CS index value is increased by one in each OFDM symbol, as shown in FIG. 4 and FIG. 5, it can be expressed as follows.

$$\{s(0), s(1), \ldots, s(9)\} = \{w_i(0)d(0)r(n,0), w_i(1)d(1)r(n,1), \ldots, w_i(3)d(9)r(n,9)\}$$

The two-dimensionally spread sequences {s(0), s(1), ..., s(9)} are subjected to IFFT and thereafter are transmitted through corresponding RBs. Accordingly, an ACK/NACK signal is transmitted on a PUCCH.

An orthogonal sequence index i, a CS index $I_{cs}$, and an RB index m are parameters required to configure the PUCCH, and are ACK/NACK resources (also called PUCCH resources) used to identify the PUCCH (or UE). If the number of available CS indices is 12 and the number of available orthogonal sequence indices is 3, PUCCHs for 36 UEs in total can be multiplexed to one RB.

An ACK/NACK resource defined with the three parameters for configuring the PUCCH is identified by a resource index $n^{(1)}_{PUCCH}$ in 3GPP LTE.

Figure 7:
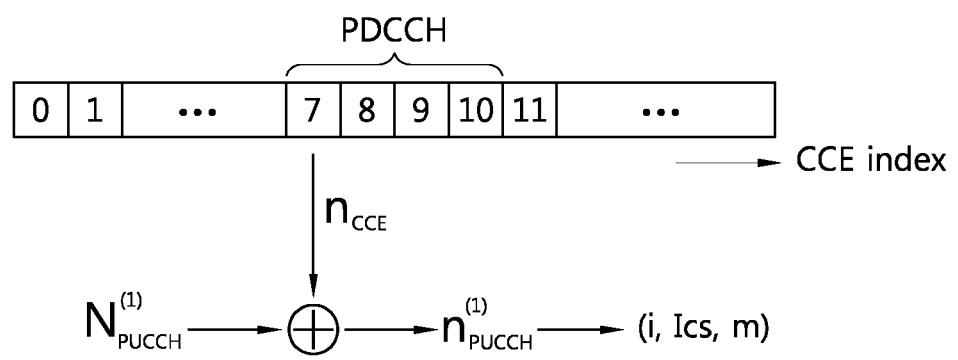
FIG. 7 shows a method of acquiring a resource for configuring a physical uplink control channel (PUCCH).

FIG. 7 shows a method of acquiring a resource for configuring a PUCCH.

A resource index $n^{(1)}_{PUCCH}$ is defined to $n^{(1)}_{PUCCH} = n_{CCE} + N^{(1)}_{PUCCH}$, where $n_{CCE}$ is an index of a $1^{st}$ CCE of a PDCCH used for transmission of a corresponding DCI (i.e., a DL resource allocation used for reception of a DL transport block corresponding to an ACK/NACK signal), and $N^{(1)}_{PUUCH}$ is a value reported by a BS to a UE via a higher layer message.

It is assumed herein that a PDCCH of which a DL allocation is detected uses 4 CCEs having CCE indices 7, 8, 9, and 10 in a control region. The index of the 1$^{st}$ CCE of the PDCCH (or a lowest CCE index) is $n_{CCE}$=7. Since $N^{(1)}_{PUUCH}$ is a parameter given by the BS, the UE can determine the resource index $n^{(1)}_{PUUCH}$.

On the basis of the resource index $n^{(1)}_{PUUCH}$, the UE can determine the orthogonal sequence index i, the CS index $I_{cs}$, and the RB index m to configure the PUCCH.

As a result, it can be said that the ACK/NACK resource used for transmission of the PUCCH is implicitly determined depending on a resource of a corresponding PDCCH. This is because the BS does not separately report a resource used by the UE for transmission of the PUCCH for the ACK/NACK signal and indirectly reports it by using a resource of a PDCCH used for resource allocation of a DL transport block.

Now, a multi-carrier system will be described.

The 3GPP LTE system supports a case where a DL bandwidth and a UL bandwidth are set differently under the premise that one CC is used. This implies that the 3GPP LTE is supported only for a case where the DL bandwidth and the UL bandwidth are equal to or different from each other in a situation where one CC is defined for each of a DL and a UL. For example, the 3GPP LTE may support up to 20 MHz, and supports only one CC for the UL and the DL even if the UL bandwidth and the DL bandwidth may be different from each other.

Spectrum aggregation (also referred to as bandwidth aggregation or carrier aggregation) is for supporting a plurality of CCs. The spectrum aggregation is introduced to support an increasing throughput, to prevent cost rising caused by introduction of a broadband radio frequency (RF) device, and to ensure compatibility with a legacy system. For example, when 5 CCs are assigned with a granularity of a carrier unit having a bandwidth of 20 MHz, a bandwidth of up to 100 MHz can be supported.

The spectrum aggregation can be classified into contiguous spectrum aggregation achieved between consecutive carriers in a frequency domain and non-contiguous spectrum aggregation achieved between discontinuous carriers. The number of aggregated CCs may be set differently between the DL and the UL. Symmetric aggregation is achieved when the number of DL CCs is equal to the number of UL CCs. Asymmetric aggregation is achieved when the number of DL CCs is different from the number of UL CCs.

Hereinafter, a multi-carrier system implies a system supporting multiple carriers on the basis of spectrum aggregation. The multi-carrier system can use contiguous spectrum aggregation and/or non-contiguous spectrum aggregation, and also can use either symmetric aggregation or asymmetric aggregation.

Figure 8:
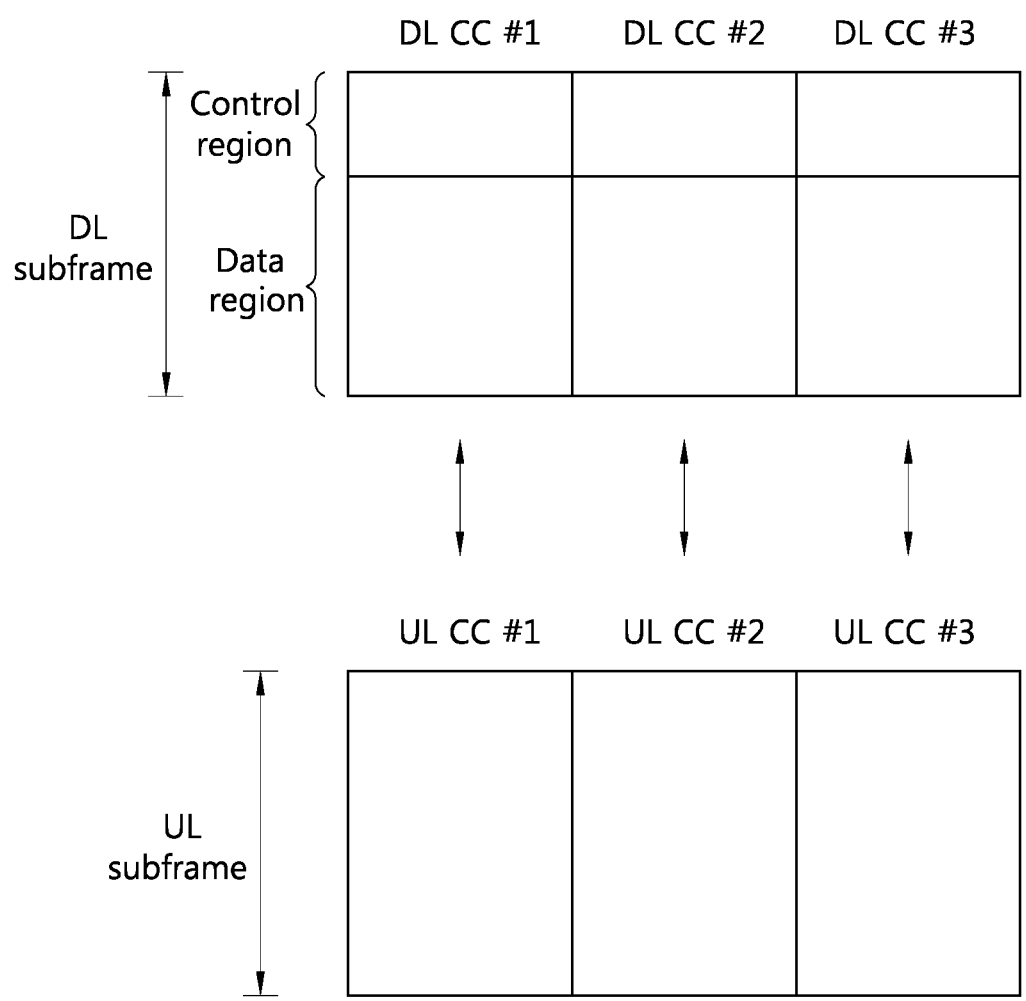
FIG. 8 shows an example of multiple carriers.

FIG. 8 shows an example of multiple carriers. Although 3 DL CCs and 3 UL CCs are shown herein, the number of DL CCs and the number of UL CCs are not limited thereto. In each DL CC, a PDCCH and a PDSCH are independently transmitted. In each UL CC, a PUCCH and a PUSCH are independently transmitted.

Cross-carrier scheduling may be possible among the plurality of CCs. That is, by using a DL grant (or UL grant) of a PDCCH of a DL CC #1, a PDSCH of a DL CC #2 (or a PUSCH transmitted on a UL CC #2 not linked to the DL CC #1) can be indicated. A CC on which the PDCCH is transmitted is referred to as a PDCCH carrier, a scheduling carrier, a reference carrier, or a primary carrier. A CC on which the PDSCH/PUSCH is transmitted is referred to a PDSCH/PUSCH carrier, a scheduled carrier, or a secondary carrier.

The reference carrier is a DL CC and/or a UL CC which is used preferentially between the BS and the UE (or on which essential control information is exchanged).

Figure 9:
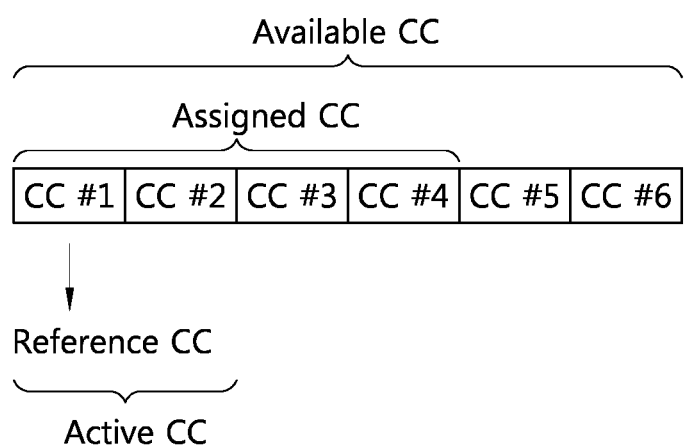
FIG. 9 shows exemplary management of multiple carriers.

FIG. 9 shows exemplary management of multiple carriers. Even if a multi-carrier system supports a plurality of CCs, the number of supported CCs may differ according to capability of a UE or a cell.

An available CC indicates all CCs that can be used by a system. Herein, 6 CCs, i.e., CC #1 to CC #6, are used.

An assigned CC is a CC assigned by a BS to the UE according to the capability of the UE. Although it is shown that the CC #1 to the CC #4 are assigned CCs, the number of assigned CCs may be less than or equal to the number of available CCs.

An active CC is a CC used by the UE to receive and/or transmit a control signal and/or data to/from the BS. The UE can perform PDCCH monitoring and/or PDSCH buffering with respect to some or all of active CCs. The active CC can be activated or deactivated among the assigned CCs. A CC which is always activated among the active CCs is referred to as a reference CC.

Figure 10:
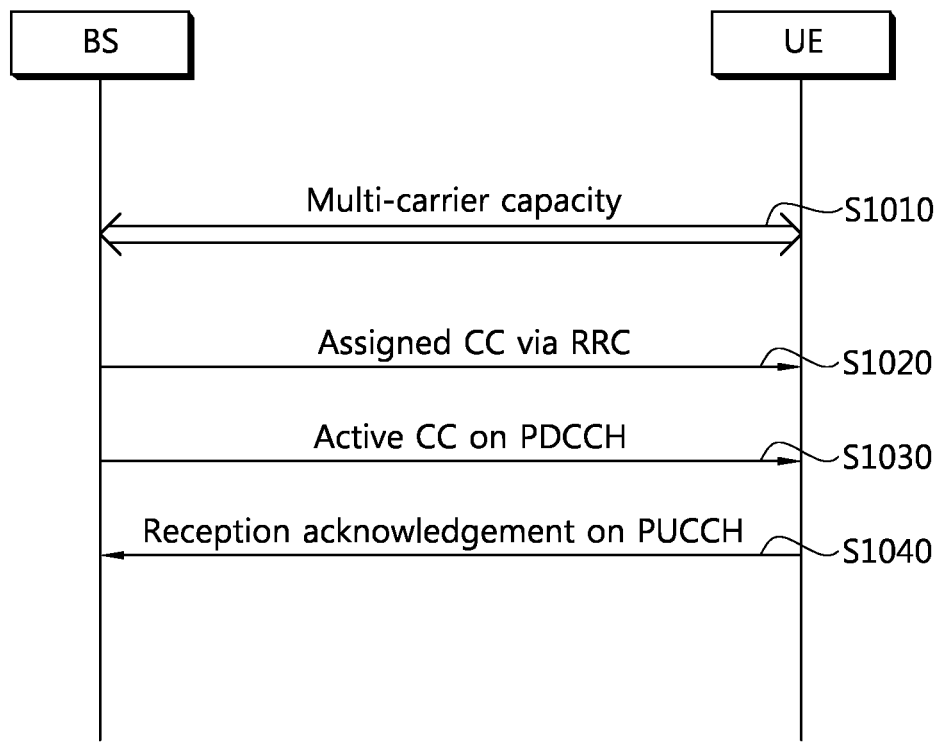
FIG. 10 is a flowchart showing a communication method according to an embodiment of the present invention.

FIG. 10 is a flowchart showing a communication method according to an embodiment of the present invention.

First, a BS and a UE exchange multi-carrier capacity (step S1010). The BS can send information regarding an available CC to the UE, and the UE can send information regarding a DL CC/UL CC that can be supported by the UE to the BS.

The BS reports information regarding an assigned CC determined based on the multi-carrier capacity to the UE (step S1020). The information regarding the assigned CC can be transmitted via a higher layer message such as a radio resource control (RRC) message. The information regarding the assigned CC can be transmitted on a reference CC.

The BS transmits DCI including the information regarding the active CC which is activated (or deactivated) among assigned CCs (referred to as activation DCI) to the UE through a PDCCH (step S1030). The activation DCI can be transmitted on the reference CC. The PDCCH on which the activation DCI is transmitted is called an activation PDCCH.

The UE transmits a reception acknowledgement for the activation DCI through the PUCCH (step S1040). The reception acknowledgement is an acknowledgment signal for indicating that the UE has successfully received the activation DCI, and is called an activation reception acknowledgment. After the BS receives the activation reception acknowledgement, the BS and the UE activate a CC designated as the active CC.

By performing PDCCH monitoring and/or PDSCH buffering only for the active CC among the assigned CCs, power consumption caused by blind decoding and/or data region buffering can be reduced. However, when the UE fails to receive the activation DCI including the information regarding the active CC, the active CC may be mismatched between the BS and the UE. This implies that the UE may perform unnecessary PDCCH monitoring even for a CC which is not the active CC until another activation DCI is received.

Therefore, according to the proposed method, the activation reception acknowledgement indicating whether the UE has normally received the DCI is sent to the BS.

An interval for sending the activation reception acknowledgement (this is referred to as a reception acknowledgement interval) can be predetermined. For example, upon receiving the activation DCI in an n$^{th}$ subframe, the activation reception acknowledgement can be sent in an $(n+r)^{th}$ subframe. In this case, r is a natural number greater than 1. The reception acknowledgement is in regards to the activation DCI itself, and thus PDSCH decoding is not required. The reception acknowledgement interval can be set to a small interval in which an HARQ ACK/NACK signal is transmitted with an HARQ interval. For example, since the HARQ ACK/NACK signal is transmitted in 4 subframes in 3GPP LTE, the reception acknowledgement interval can be set to 3 subframes (r=3).

The activation reception acknowledgement indicates whether the UE receives the activation DCI itself, and thus is different from the HARQ ACK/NACK signal that indicates whether a data packet on a PDSCH indicated by a PDCCH is successfully decoded. Therefore, instead of the PUCCH formats 1a/1b used for transmission of a 1-bit or 2-bit HARQ ACK/NACK signal, the PUCCH format 1 can be used for the activation reception acknowledgement. That is, if transmission of the activation reception acknowledgement is detected through the PUCCH in the $(n+r)^{th}$ subframe, the BS determines that the UE has successfully received the activation DCI, and if transmission of the activation reception acknowledgement is not detected in the $(n+r)^{th}$ subframe, the BS determines that the UE fails to receive the activation DCI.

In one embodiment, a resource index $n^{(1)}_{PUUCH}$ for configuring the PUCCH for the activation reception acknowledgement can be determined based on a resource used for transmission of the PDCCH of the activation DCI. For example, the resource index $n^{(1)}_{PUUCH}$ is determined based on a $1^{st}$ CCE index of the PDCCH used for transmission of the activation DCI.

In another embodiment, a resource index for configuring the PUCCH for the activation reception acknowledgement can be reserved in advance. This implies that a resource used for the activation reception acknowledgement is reserved among available PUCCH resources, and the reserved reception acknowledgement resource is not used for transmission of a scheduling request (SR) or an HARQ ACK/NACK signal.

In another embodiment, a resource index for configuring the PUCCH for the activation reception acknowledgement can be configured to be the same as the resource reserved for the SR. In 3GPP LTE, the SR is transmitted with an SR interval predetermined by the BS. If the activation reception acknowledgement does not overlap with the SR interval, collision does not occur between the SR and the activation reception acknowledgement even if the SR and the activation reception acknowledgement use the same PUCCH resource. In this case, the BS transmits the activation DCI in such a manner that the activation reception acknowledgement does not overlap with an interval in which the UE transmits the SR. For example, when the activation reception acknowledgement is transmitted in a $(k+3)^{th}$ subframe, collision between the SR and the activation reception acknowledgement can be avoided by properly scheduling a $k^{th}$ subframe in which the activation DCI is transmitted.

Reservation of the reception acknowledgement resource may be predetermined, or may be reported by the BS to the UE via a higher layer message such as an RRC message.

By defining a resource reserved for the PUCCH of the activation reception acknowledgement, collision occurring in transmission of the HARQ ACK/NACK signal can be avoided.

Figure 11:
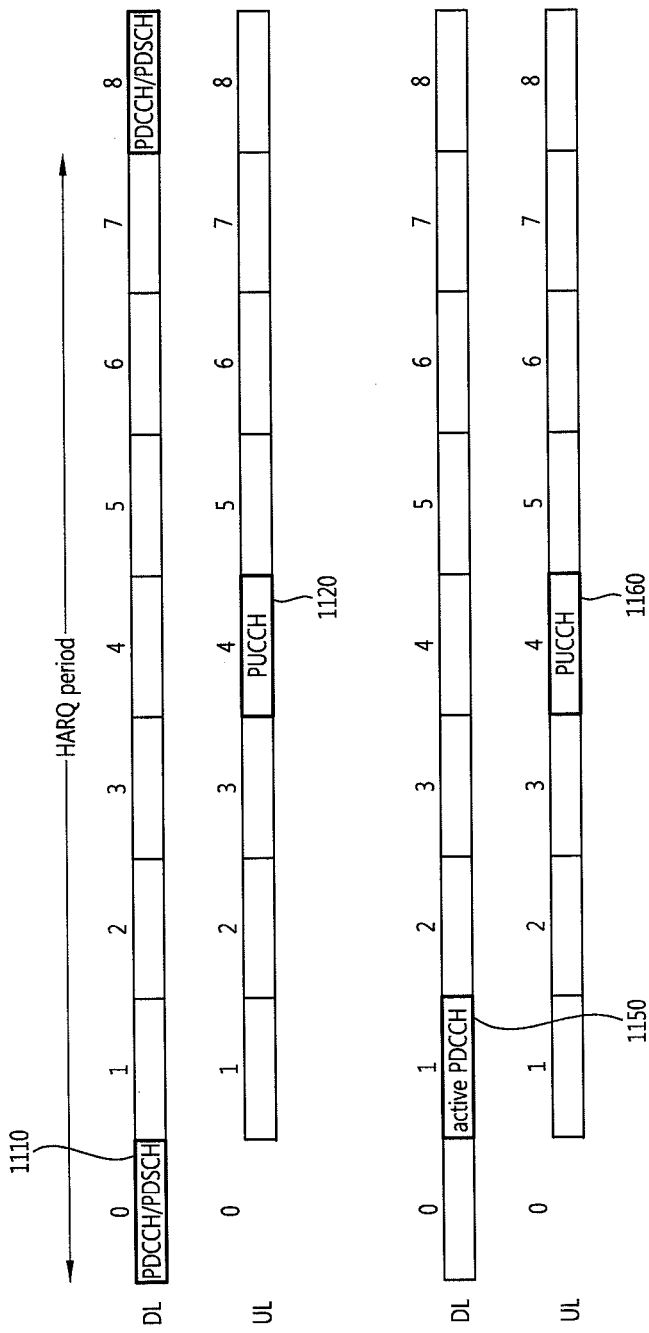
FIG. 11 shows an example of collision occurring in transmission of an activation reception acknowledgement and an HARQ acknowledgement (ACK)/not-acknowledgement (NACK) signal.

FIG. 11 shows an example of collision occurring in transmission of an activation reception acknowledgement and an HARQ ACK/NACK signal.

In a $1^{st}$ subframe (index=0), a UE receives a data packet through a PDSCH indicated by a PDCCH 1110. When an HARQ ACK/NACK signal has an interval of 4 subframes, in a $5^{th}$ subframe (index=4), the UE transmits an HARQ ACK/NACK signal for the data packet through a PUCCH 1120.

In addition, in a $2^{nd}$ subframe (index=1), the UE receives activation DCI through an activation PDCCH 1150. When a reception acknowledgement interval is 3 subframes, in the $5^{th}$ subframe (i.e., index=4), the UE transmits an activation reception acknowledgement through a PUCCH 1160.

If a $1^{st}$ CCE index of the PDCCH 1110 of the data packet is equal to a $1^{st}$ CCE index of the activation PDCCH 1150, collision occurs in the $5^{th}$ subframe since the PUCCH 1120 for the HARQ ACK/NACK signal and the PUCCH 1160 for the activation reception acknowledgement have the same resource index, and the UE inevitably sends one of the two signals. However, if a resource for the activation reception acknowledgement, i.e., a reception acknowledgement resource, is reserved in advance, the two signals can be transmitted simultaneously.

FIG. 12 shows an example of simultaneous transmission of an HARQ ACK/NACK signal and an activation reception acknowledgement. When there are $N_{PUUCH}+1$ PUCCH resources, resource indices 0 to 2 are reserved for a reception acknowledgement resource for transmission of the activation reception acknowledgement, and resource indices 3 to $N_{PUCCH}$ are reserved for the ACK/NACK resource. At least one of the resource indices 0 to 2 is allocated to each UE as the reception acknowledgement resource.

If it is necessary to simultaneously transmit the HARQ ACK/NACK signal and the activation reception acknowledgement in a specific subframe, the UE transmits a modulation symbol d(0) of the HARQ ACK/NACK signal through a PUCCH configured by using the reserved reception acknowledgement resource. That is, on the basis of a resource index $n^{(1)}_{PUUCH}$ corresponding to the reserved reception acknowledgement resource, the UE can determine the aforementioned orthogonal sequence index i, CS index $I_{cs}$, and RB index m. By spreading the modulation symbol d(0) to a cyclically shifted index and an orthogonal sequence and then by mapping it to an RB, the HARQ ACK/NACK signal and the activation reception acknowledgement can be transmitted simultaneously in the same subframe.

A BS can recognize the activation reception acknowledgement by existence of PUCCH transmission configured with the reception acknowledgement resource. Further, the BS can detect the HARQ ACK/NACK signal by decoding a modulation symbol on the PUCCH.

Figure 13:
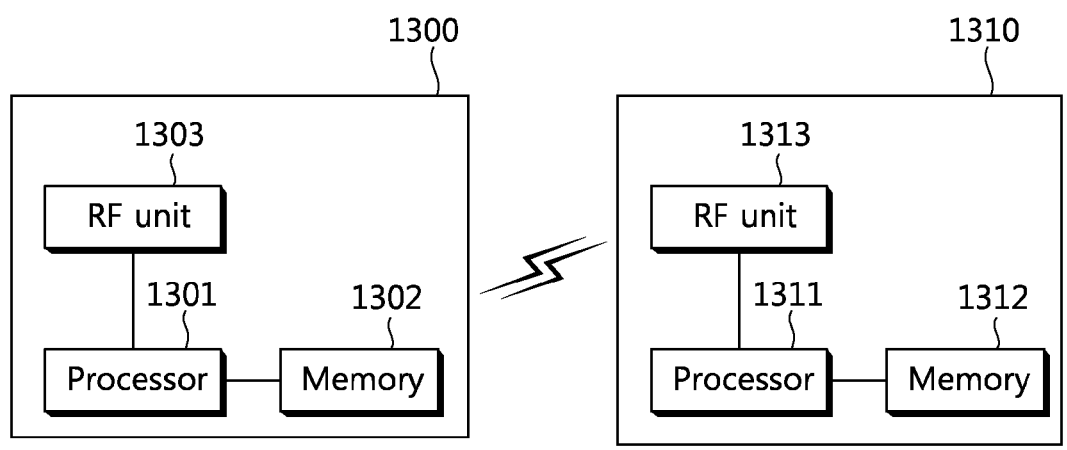
FIG. 13 is a block diagram showing a wireless communication system for implementing an embodiment of the present invention.

FIG. 13 is a block diagram showing a wireless communication system for implementing an embodiment of the present invention.

A BS 1300 includes a processor 1301, a memory 1302, and a radio frequency (RF) unit 1303.

The processor 1301 implements the proposed functions, procedures, and/or methods. An operation of the BS can be implemented by the processor 1301 in the aforementioned embodiment. The processor 1301 supports multiple carriers, and activates or deactivates an active CC. The processor 1301 can receive a reception acknowledgement for activation control information to be activated (or deactivated) from a UE.

The memory 1302 is coupled to the processor 1301, and stores a protocol or parameter for an operation. The RF unit 1303 is coupled to the processor 1301, and transmits and/or receives a radio signal.

A UE 1310 includes a processor 1311, a memory 1312, and an RF unit 1313.

The processor 1311 implements the proposed functions, procedures, and/or methods. An operation of the UE can be implemented by the processor 1311 in the aforementioned embodiment. The processor 1311 can receive activation control information from the BS, and can feed back an activation reception acknowledgment to the BS.

The memory 1312 is coupled to the processor 1311, and stores a protocol or parameter for an HARQ operation. The RF unit 1313 is coupled to the processor 1311, and transmits and/or receives a radio signal.

The processors 1301 and 1311 may include an application-specific integrated circuit (ASIC), a separate chipset, a logic circuit, and/or a data processing unit. The memories 1302 and 1312 may include a read-only memory (ROM), a random access memory (RAM), a flash memory, a memory card, a storage medium, and/or other equivalent storage devices. The RF units 1303 and 1313 may include a base-band circuit for processing a radio signal. When the embodiment of the present invention is implemented in software, the aforementioned methods can be implemented with a module (i.e., process, function, etc.) for performing the aforementioned functions. The module may be stored in the memories 1302 and 1312 and may be performed by the processors 1301 and 1311. The memories 1302 and 1312 may be located inside or outside the processors 1301 and 1311, and may be coupled to the processors 1301 and 1311 by using various well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

The above-described embodiments include various aspects of examples. Although all possible combinations for describing the various aspects may not be described, those skilled in the art may appreciate that other combinations are possible. Accordingly, the present invention should be construed to include all other replacements, modifications, and changes which fall within the scope of the claims.

The invention claimed is:

1. A communication method in a multi-carrier system, the method comprising:
   receiving, by a user equipment (UE), information regarding at least one assigned component carrier among a plurality of component carriers via a radio resource control (RRC) message from a base station;
   receiving, by the UE, activation control information regarding an active component carrier that is activated among the at least one assigned component carrier through a downlink control channel; and
   transmitting, by the UE, a reception acknowledgement for the activation control information through an uplink control channel,
   wherein the active component carrier is used by the UE to receive and/or transmit data, and
   wherein an interval for transmitting the reception acknowledgement is less than an interval for transmitting a hybrid automatic repeat request (HARQ) acknowledgement (ACK)/not-acknowledgement (NACK) signal.

2. The method of claim 1, wherein the downlink control channel is a physical downlink control channel (PDCCH), and the uplink control channel is a physical uplink control channel (PUCCH).

3. The method of claim 2, wherein a reception acknowledgement resource used for transmission of the PUCCH is determined on the basis of a resource used for transmission of the PDCCH.

4. The method of claim 2, wherein a reception acknowledgement resource used for transmission of the PUCCH is reserved in advance.

5. The method of claim 4, wherein information regarding the reserved reception acknowledgement resource is received from the base station.

6. The method of claim 4, wherein when a subframe for transmitting the reception acknowledgement overlaps with a subframe for transmitting the HARQ ACK/NACK signal, the HARQ ACK/NACK signal is transmitted through the PUCCH configured by using the reception acknowledgement resource.

7. A user equipment (UE), comprising:
   a radio frequency (RF) unit configured to transmit and receive a radio signal; and
   a processor operatively connected to the RF unit and configured to:
   receive information regarding at least one assigned component carrier among a plurality of component carriers via a radio resource control (RRC) message from a base station,
   receive activation control information regarding an active component carrier that is activated among the at least one assigned component carrier through a downlink control channel, and
   transmit a reception acknowledgement for the activation control information through an uplink control channel,
   wherein the active component carrier is used by the UE to receive and/or transmit data, and
   wherein the interval for transmitting the reception acknowledgement is less than an interval for transmitting a hybrid automatic repeat request (HARQ) acknowledgement (ACK)/not-acknowledgement (NACK) signal.

8. The UE of claim 7, wherein the downlink control channel is a physical downlink control channel (PDCCH), and the uplink control channel is a physical uplink control channel (PUCCH).

9. The UE of claim 8, wherein a reception acknowledgement resource used for transmission of the PUCCH is determined on the basis of a resource used for transmission of the PDCCH.

10. The UE of claim 8, wherein a reception acknowledgement resource used for transmission of the PUCCH is reserved in advance.

11. The UE of claim 10, wherein information regarding the reserved reception acknowledgement resource is received from the base station.

12. The UE of claim 10, wherein when a subframe for transmitting the reception acknowledgement overlaps with a subframe for transmitting the HARQ ACK/NACK signal, the HARQ ACK/NACK signal is transmitted through the PUCCH configured by using the reception acknowledgement resource.

* * * * *